United States Patent [19]
Nakamura et al.

[11] Patent Number: 5,988,678
[45] Date of Patent: Nov. 23, 1999

[54] STRUCTURE FOR MOUNTING OF INTERNAL PART FOR VEHICLE

[75] Inventors: Keishin Nakamura; Daijiro Sawane, both of Wako, Japan

[73] Assignees: Honda Giken Kogyo Kabushiki Kaisha; Kumi Kasei Co., Ltd., both of Tokyo, Japan

[21] Appl. No.: 08/904,261

[22] Filed: Jul. 31, 1997

[30] Foreign Application Priority Data

Aug. 2, 1996 [JP] Japan .................................... 8-204497

[51] Int. Cl.⁶ .................................................. B60R 21/04
[52] U.S. Cl. ........................... 280/751; 296/35.2; 24/297
[58] Field of Search .................................... 280/751, 748, 280/752; 296/35.2, 35.1, 153, 146.7, 189; 24/297

[56] References Cited

U.S. PATENT DOCUMENTS

| | | | |
|---|---|---|---|
| 3,797,857 | 3/1974 | Reeves | 280/751 |
| 3,897,967 | 8/1975 | Barenyi | 24/297 |
| 4,739,543 | 4/1988 | Harris | 24/297 |
| 5,341,544 | 8/1994 | Richter et al. | 24/297 |
| 5,448,804 | 9/1995 | Warren | 24/297 |

FOREIGN PATENT DOCUMENTS 8-72642  3/1996  Japan .

*Primary Examiner*—Paul N. Dickson
*Attorney, Agent, or Firm*—Armstrong, Westerman, Hattori, McLeland & Naughton

[57] ABSTRACT

Simplified structure and arrangement for fixing an internal part to a vehicle body forming member in a single step during assembly of an automobile without use of a separate fixing member. This enhances efficient assembly of the internal part to the vehicle body forming member. An insert boss integrally provided on an internal part such as a shock absorbing member and having a deformable portion is inserted into an insert bore in a roof side rail as a vehicle body forming member while deforming the portion, to fix the shock absorbing member to the roof side rail.

2 Claims, 7 Drawing Sheets

Within vehicle compartment

Within vehicle compartment

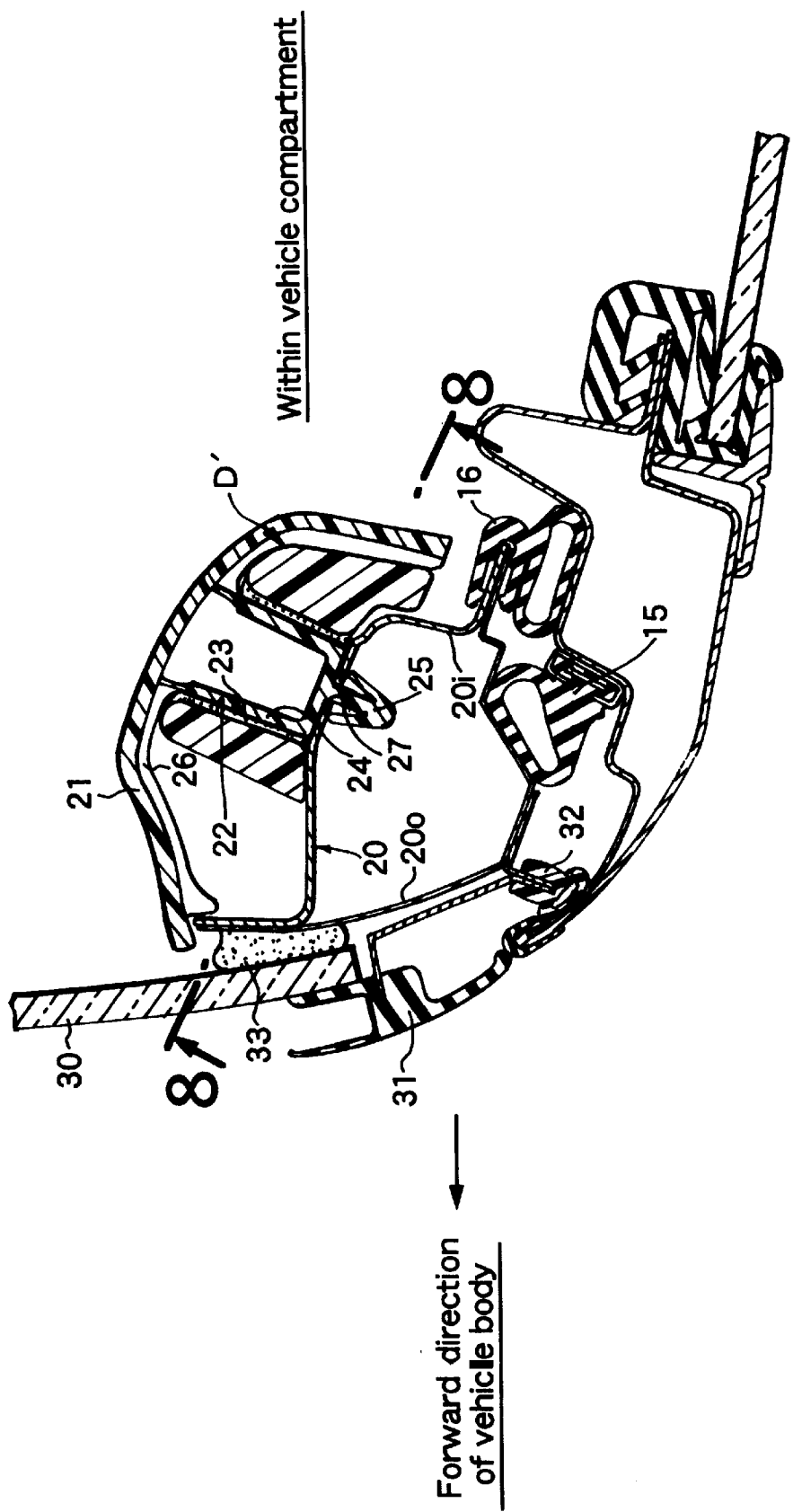

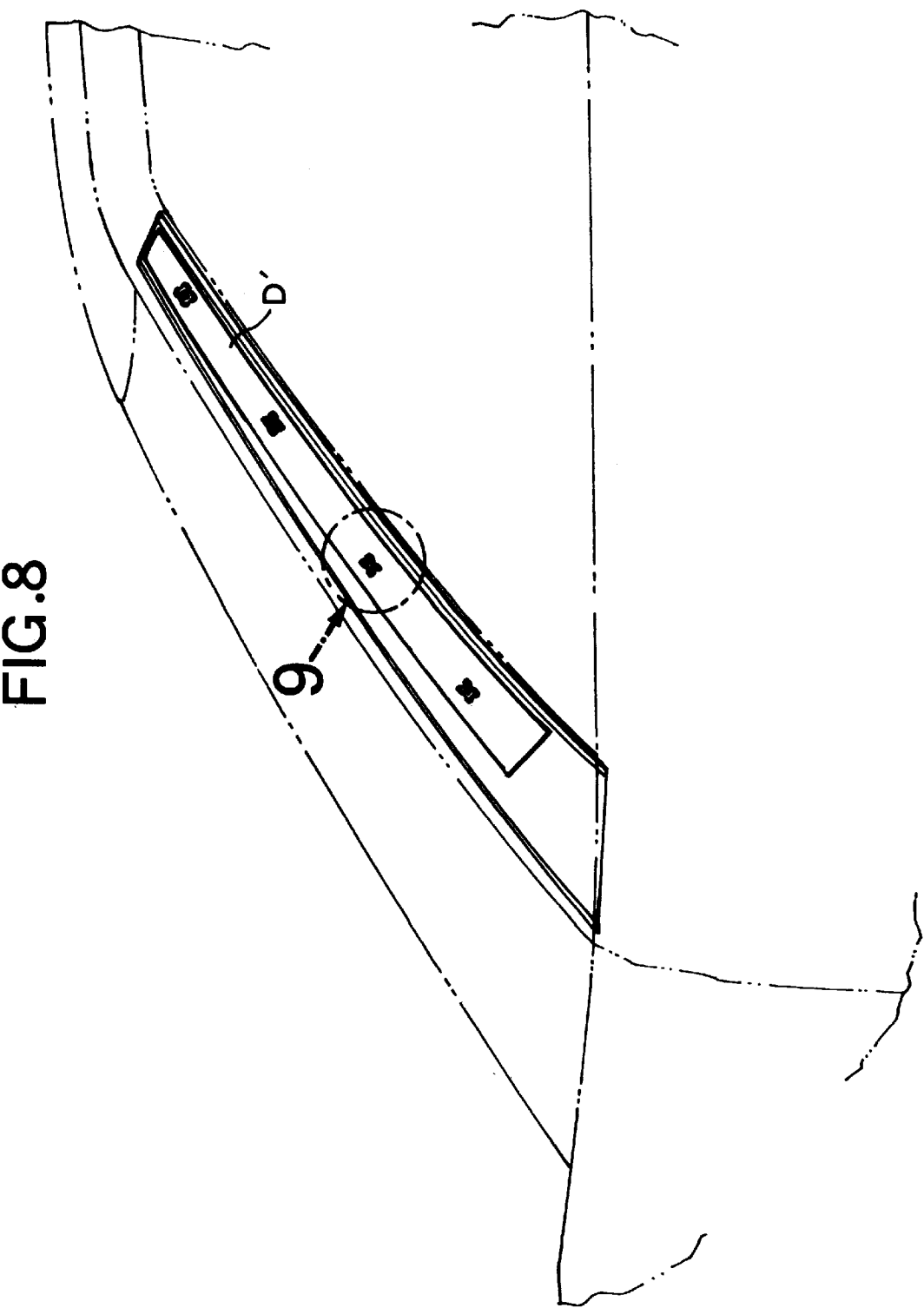

STRUCTURE FOR MOUNTING OF INTERNAL PART FOR VEHICLE

BACKGROUND OF THE INVENTION

1. Technical Field of the Invention

The present invention relates to a structure for integrally mounting an internal part such as a shock absorbing member and the like to a vehicle body forming member in a vehicle body.

2. Description of Related Art

A conventional common means for integrally mounting an internal part such as a garnish, a lining and the like provided to a body of a vehicle is to mount the internal part to the vehicle body forming member such as a panel, a pillar and the like using a fixing member such as a clip, a tapping machine screw or the like which is separate from the internal part. For example, a means for mounting an internal part to a pillar as a vehicle body forming member by using a machine screw is disclosed in Japanese Patent Application Laid-open No.8-72642.

However, the following problems are encountered when using such conventional mounting means because the internal part is mounted to the vehicle body forming member by a fixing member separate from the internal part:

(1) The time for mounting the internal part to the vehicle body forming member is prolonged;

(2) A plurality of separate fixing members are required, thereby bringing about an increase in the total weight;

(3) A lot of time is required to separate the internal part and the fixing member and for this reason, disassembly and recycling are difficult; and (4) An increase in cost is experienced due to the large number of parts required and prolonged mounting time.

SUMMARY OF THE INVENTION

The present invention has been accomplished with such circumstance in view, and it is an object of the present invention to provide a new structure for mounting of an internal part for a vehicle, wherein all of the above problems have been solved.

To achieve the above object, in accordance with the present invention, there is provided a structure for mounting of a vehicle internal part provided in a vehicle body of a vehicle to a vehicle body forming member, which includes an insert boss integrally provided on a back of the internal part and having a deformable portion on an outer peripheral surface thereof, and an insert bore provided in the vehicle body forming member, so that the internal part is integrally mounted to the vehicle body forming member by inserting the insert boss into the insert bore while deforming the deformable portion. Thus, for example, a shock absorbing member as the internal part can be integrally mounted at a single step to a roof side rail as the vehicle body forming member without use of a separate fixing member.

According to the present invention, it is preferred that the insert boss have a rib-like deformable portion integrally provided on an outer periphery of a cylindrical core to extend radially, and the maximum diameter of a phantom circle described by an outer peripheral edge of the insert boss is larger than the diameter of the insert bore. The deformable portion acts to facilitate the resilient or plastic deformation of the insert boss.

In another embodiment of the present invention, there is provided a structure for mounting of a vehicle internal part provided in a vehicle body of a vehicle to a vehicle body forming member, which includes an insert bore provided in the internal part and having a deformable portion on an inner peripheral surface thereof, and an insert boss integrally provided on the vehicle body forming member, so that the internal part is integrally mounted to the vehicle body forming member by inserting the insert boss into the insert bore while deforming the deformable portion. Thus, for example, a shock absorbing member as the internal part can be integrally mounted at a single step to a front pillar garnish as the vehicle body forming member without use of a separate fixing member.

BRIEF DESCRIPTION OF THE DRAWINGS

FIG. 7 is a partially enlarged sectional view taken along a line 7—7 in FIG. 1;

FIG. 8 is a back view of a shock absorbing member taken along a line 8—8 in FIG. 7.

DESCRIPTION OF THE PREFERRED EMBODIMENTS

Figure 1:
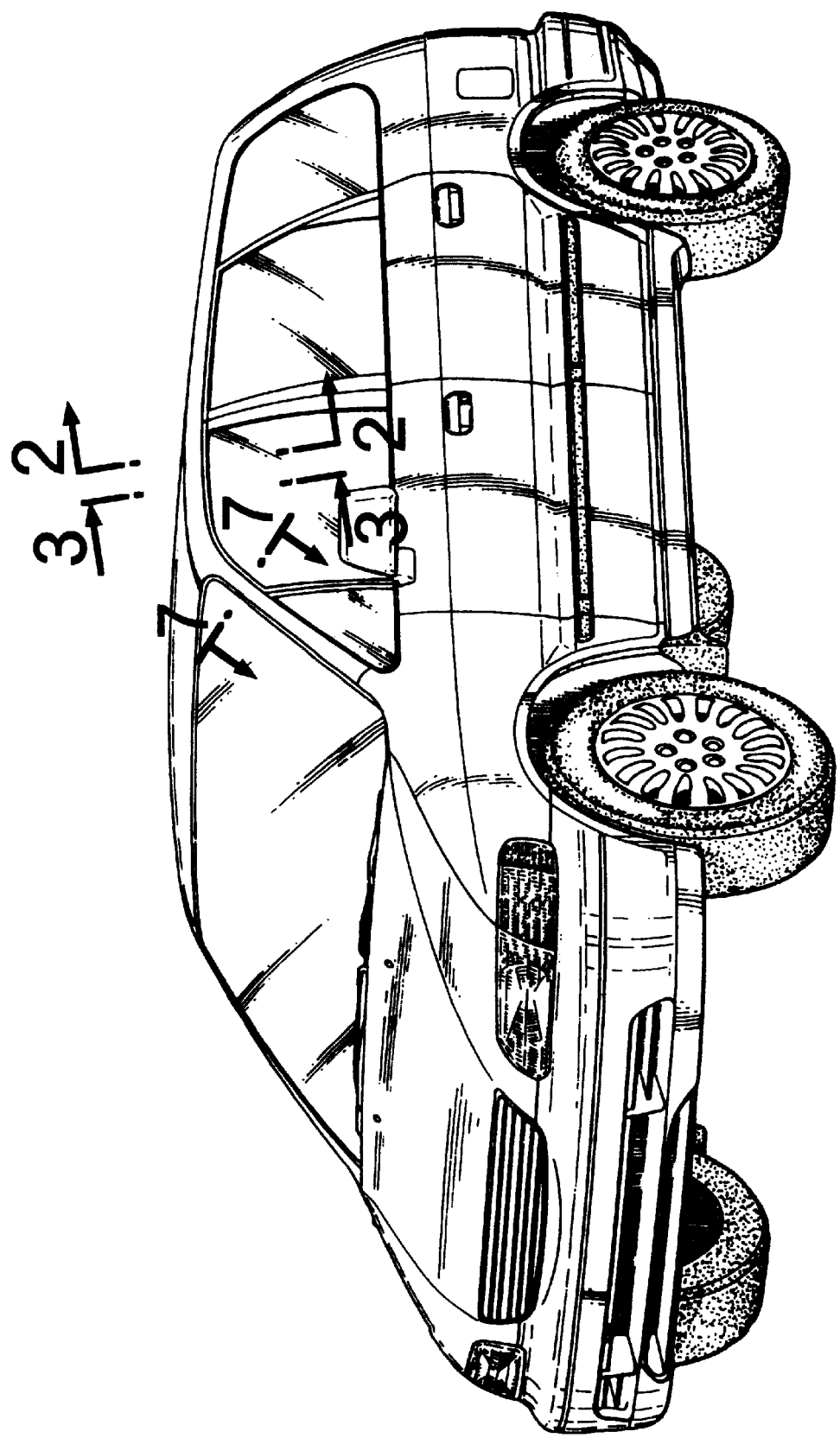
FIG. 1 is a perspective view of an automobile equipped with a structure according to the present invention.

The mode for carrying out the invention will now be described by way of embodiments with reference to the accompanying drawings.

A first embodiment of the present invention will be first described with reference to FIGS. 1 to 6.

In the first embodiment, the present invention is carried out to temporarily fix a shock absorbing member D as an internal part to a roof side rail 3 as a vehicle body forming member, which is mounted in a space between a roof panel 1 and a head lining 2 at an upper portion of a vehicle body of an automobile.

The shock absorbing member D is mounted in an upper section within the vehicle body and used to moderate an external force applied mainly to the head of an occupant. As clearly shown in FIGS. 4 and 5, the shock absorbing member D is formed into an elongated rectangular shape from a synthetic resin such as a urethane, a polypropylene, a polyethylene and the like, and has mounting portions d formed at opposite ends thereof at a thickness smaller than that of a main portion and each provided a mounting bore. A pair of insert bosses B are integrally formed in a projecting manner at a lengthwise distance on a back of the shock absorbing member D. As clearly shown in FIG. 6, each of the insert bosses B has a plurality of rib-like deformable portions 5 formed at circumferential distances on an outer peripheral surface of a solid cylindrical core 4 to project radially. The maximum diameter of a phantom circle described by an outer edge of the deformable portion 5 of the insert boss B is larger than that of an insert bore 6 provided in the vehicle body forming member which will be described hereinafter, i.e., the roof side rail 3, so that when the insert boss B is inserted into the insert bore 6, the deformable portion 5 is resiliently or plastically deformed. The core 4 of the insert boss B is formed into a truncated conical shape convergent toward a tip end, and thus, it is easy to insert the insert boss B into the insert bore 6.

Figure 2:
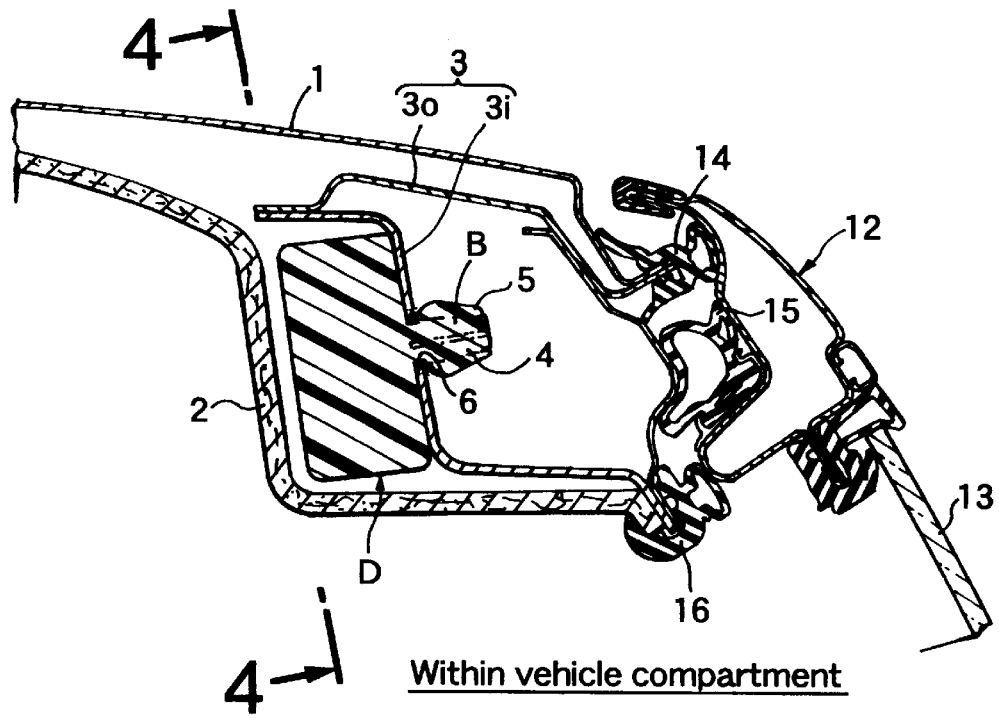
FIG. 2 is a partially enlarged sectional view taken along a line 2—2 in FIG. 1.
Figure 3:
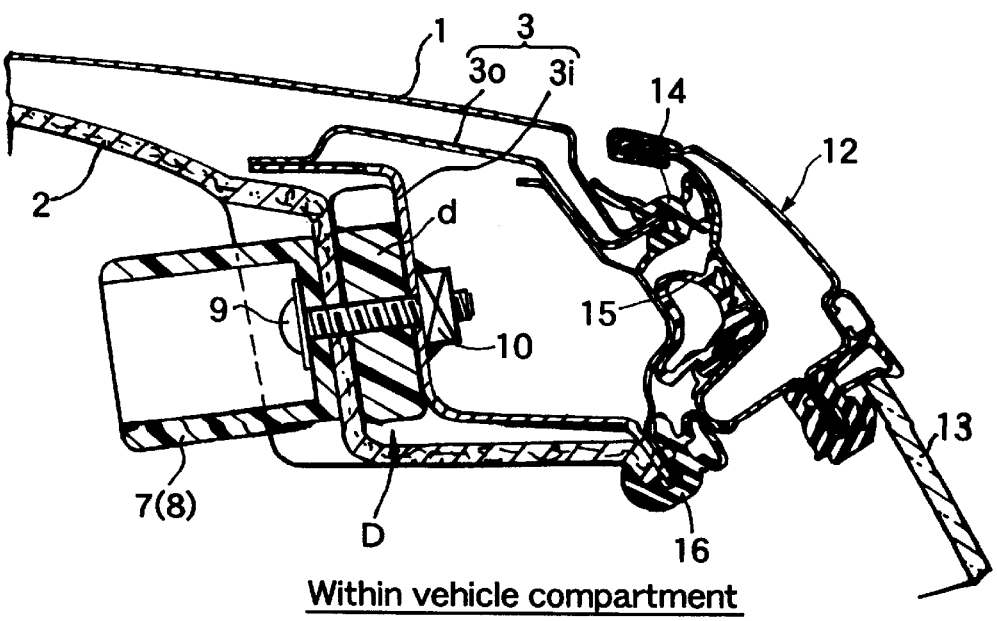
FIG. 3 is a partially enlarged sectional view taken along a line 3—3 in FIG. 1.

As shown in FIGS. 2 and 3, the roof side rail 3 is mounted in each of spaces between left and right sides of the roof panel 1 of the vehicle and the head lining 2 provided on the side of an inner surface of the roof panel 1, and is secured to one side of the roof panel 1. The roof side rail 3 is formed into a closed sectional structure by integrally welding an outer panel 3o and an inner panel 3i, and extends longitudinally of the vehicle body within the space. A plurality of insert bores 6 are provided at lengthwise distances in the inner panel 3i of the roof side rail 3. The distance between centers of the insert bores 6 is equal to the distance between centers of the pair of insert bosses B of the shock absorbing member D, and as described above, the diameter of the insert bore 6 is smaller than the maximum diameter of the phantom circle described by the outer edges of the deformable portions 5 of the mounting insert boss B.

Figure 6A:
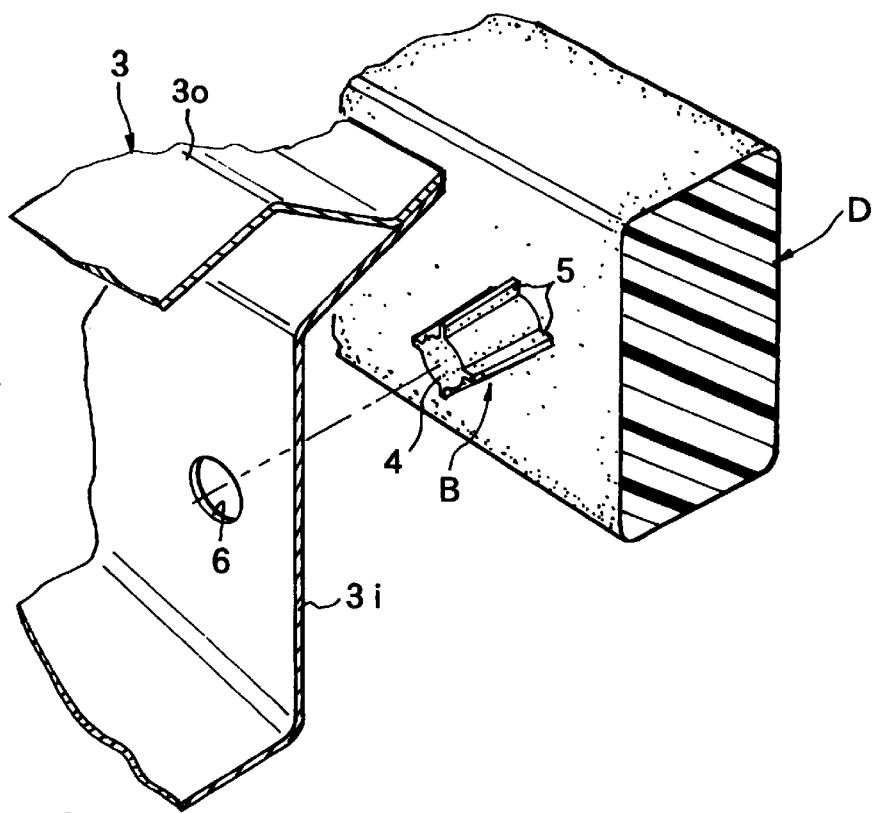
FIGS. 6A and 6B are perspective views of an internal part and a vehicle body forming member, illustrating steps of mounting the internal part to the vehicle body forming member.
Figure 6B:
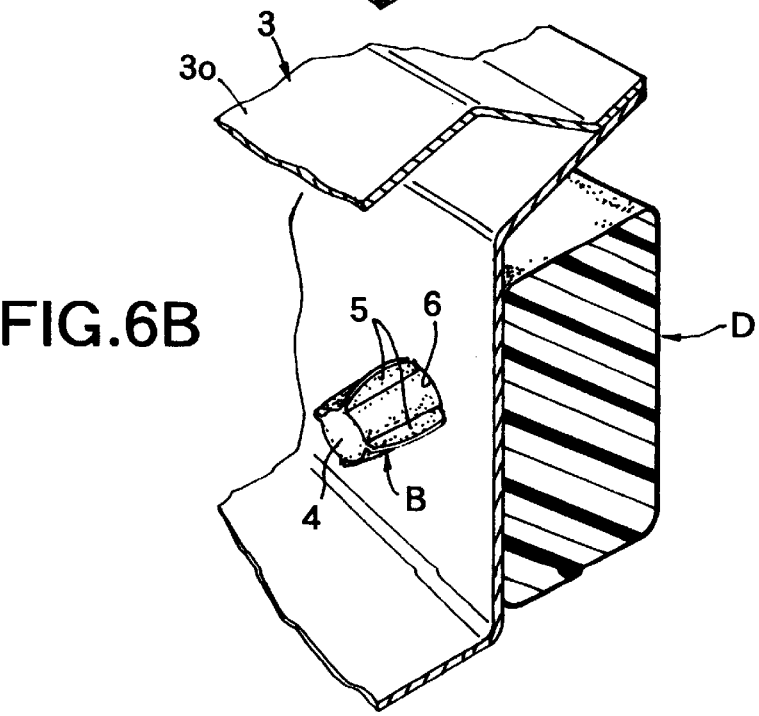

If the back of the shock absorbing member D is placed into an opposed relation to an outer surface of the inner panel 3i of the roof side rail 3 as shown in FIG. 6A and then, the insert bosses B are inserted into the insert bores 6, respectively, as shown in FIG. 6B, the plurality of rib-like deformable portions 5 of the insert bosses B are crushed, i.e., plastically or resiliently deformed, so that the insert bosses B are fitted into the insert bores 6, respectively and fixed therein under a reaction force from the deformable portions 5. Thus, the shock absorbing member D is temporarily fixed to the roof side rail 3.

Figure 4:
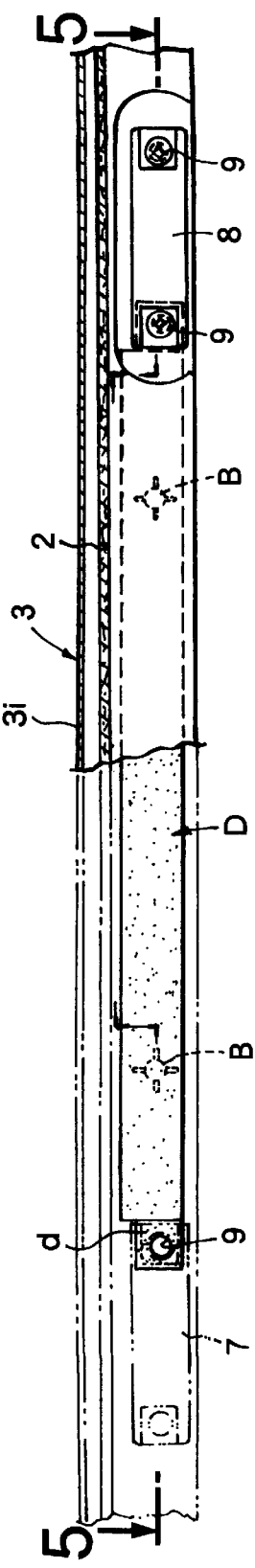
FIG. 4 is a partially cutaway partial view taken along a line 4—4 in FIG. 2.
Figure 5:
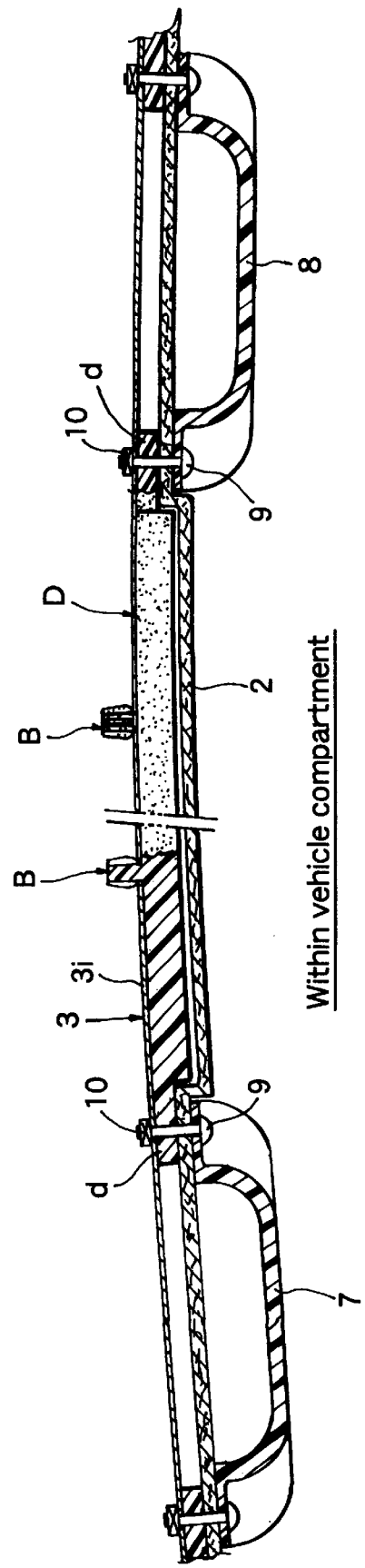
FIG. 5 is a sectional view taken along a line 5—5 in FIG. 4.

The shock absorbing member D temporarily fixed to the roof side rail 3 in the above manner is firmly fixed to the roof side rail 3 along with the head lining 2 and assist grips 7 and 8 provided in an upper portion within a vehicle compartment as shown in FIGS. 4 and 5. More specifically, the head lining 2 is superposed onto the inner panel 3i of the roof side rail 3 with the shock absorbing member D temporarily fixed thereto, and the assist grips 7 and 8 are further superposed to front and rear portions thereof. Machine screws 9 are threadedly inserted through mounting bores in the assist grips 7 and 8 into nuts 10 welded to the roof side rail 3. In the above manner, three components: the assist grips 7 and 8, the head lining 2 and the shock absorbing member D can be commonly clamped to the roof side rail 3 and finally, they can be integrally mounted thereon.

In FIGS. 2 and 3, reference character 12 is a side door panel; 13 is a side window pane; 14 is a drip seal; 15 is a door outer seal; and 16 is a door inner seal.

In the first embodiment, the shock absorbing member D can be temporarily fixed to the roof side rail 3 at a single step, and then, the three components: the shock absorbing member D, the head lining 2 and the assist grips 7 and 8 can be commonly clamped to the roof side rail 3 as the vehicle body forming member and finally firmly fixed thereto. Thus, the shock absorbing member D is opposed to the side head portion of the occupant within the vehicle compartment, so that a force produced upon abutment of an occupant's side head portion against head lining 2 can be moderated.

Figure 9:
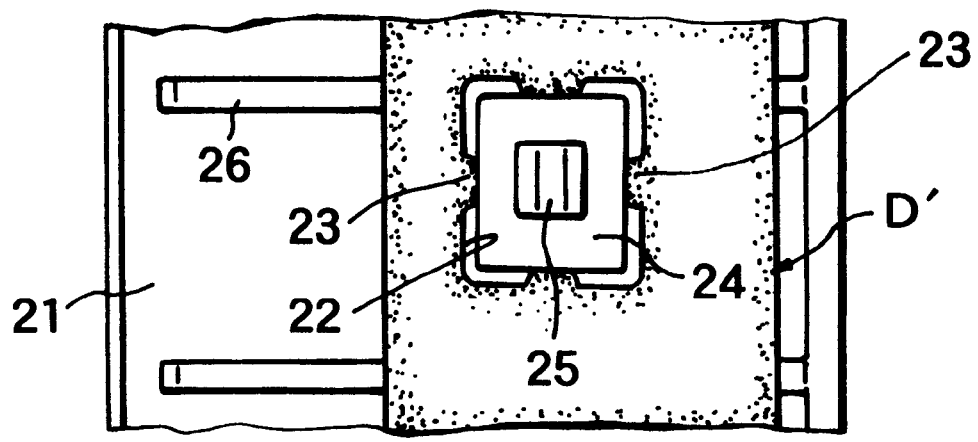
FIG. 9 is an enlarged view of a portion of FIG. 8 identified by a phantom circle.

A second embodiment of the present invention will be described with reference to FIGS. 7 to 9. In these figures, portions or components corresponding to those in the first embodiment are designated by like reference characters.

In the second embodiment, the present invention is carried out to integrally and temporarily fix a shock absorbing member D' as an internal part to a front pillar garnish 21 which is a vehicle body forming member.

The shock absorbing member D' is formed into a vertical elongated configuration from a synthetic resin such as a urethane, a polypropylene, a polyethylene and the like to extend along an inner surface of a front pillar 20. A plurality of quadrilateral insert bores 22 are provided at lengthwise distances in the shock absorbing member D' to extend through opposite surfaces thereof. A rib-like deformable portion 23 is integrally provided to extend inwardly on each of the inner side surfaces of each of the insert bores 22, as clearly shown in FIG. 9.

The front pillar 20 is formed into a closed/sectional structure by welding an outer panel 20o and an inner panel 20i to each other. A plurality of insert bosses 24 are integrally formed at lengthwise distances on a back surface of the front pillar garnish 21 provided outside of the inner panel 20i so as to cover it in correspondence to the location of the plurality of insert bores 22 provided in the shock absorbing member D'. Each insert boss 24 is formed as a truncated pyramid-shape convergent toward a tip end thereof as shown in FIG. 7. A clip 25 is integrally formed at the tip end or top surface of each of the insert bosses 24 for mounting or securing the front pillar garnish 21 to the front pillar 20. As shown in FIGS. 7 and 9, a plurality of reinforcing ribs 26 are integrally formed on the back surface of the front pillar garnish 21.

The shock absorbing member D' is temporarily fixed to the back of the front pillar garnish 21 and thereafter, the front pillar garnish 21 is finally integrally mounted to the front pillar 20. If the shock absorbing member D' is placed to correspond to the back of the front pillar garnish 21 and then, the plurality of insert bores 22 in the shock absorbing member D' are fitted over the plurality of insert bosses 24 of the front pillar garnish 21, the plurality of rib-like deformable portions 23 on the inner surface of the insert bores 22 are crushed, i.e., plastically or resiliently deformed, so that the insert bores 22 are fitted over the insert bosses 24, respectively, as shown in FIGS. 7 and 9, and the bosses 24 and bores 22 are then integrally and temporarily fixed under a reaction force from the deformable portions 23.

If the clips 25 at the outer ends of the insert bosses 24 of the front pillar garnish 21 temporarily fixed to the shock absorbing member D' in the above manner are inserted into clip bores 27 provided in the front pillar 20, respectively, the front pillar garnish 21 is integrally mounted to the front pillar 20, and the shock absorbing member D' is finally fixed between the front pillar garnish 21 and the front pillar 20.

In the second embodiment, the shock absorbing member D' can be temporarily fixed at a single step to the front pillar garnish 21. Thereafter, the shock absorbing member D' can be firmly fixed between the front pillar 20 and the front pillar garnish 21 by mounting the front pillar garnish 21 to the front pillar 20. The shock absorbing member D' serves to moderate any force resulting from contact or abutment of a vehicle occupant against the front pillar garnish 21.

In FIG. 7, reference character 30 is a front pane or windshield; 31 is a pillar parting seal; 32 is a door lip seal; and 33 is sealer.

Although the embodiments of the present invention have been described in detail, it will be understood that the present invention is not limited to the above described embodiments, and various modifications in design may be made without departing from the spirit and scope of the invention defined in the claims. For example, the shock absorbing member as the internal part has been described being mounted to the vehicle body forming member in the embodiments, but the structure according to the present invention is useful even when another internal part provided within the vehicle body, e.g., a garnish, a lining, a pillar or the like is mounted to the vehicle body forming member. In addition, the internal part has been described as being temporarily fixed to the vehicle body forming member in the embodiments, but the present invention is equally useful when the internal part is finally fixed to the vehicle body forming member.

As discussed above, according to each of claims of the present invention, the internal part provided in the vehicle body of the vehicle can be integrally mounted to the vehicle body forming member in a single step without use of a separate fixing member. As a result, it is possible to enhance the efficiency of assembling the internal part to the vehicle body forming member and to reduce the number of parts and consequently, a substantial reduction in cost can be achieved. In addition, it is easy to separate the internal part and the vehicle body forming member. This enables the parts to be easily disassembled when necessary and also contributes to a reduction in weight of the entire vehicle body.

What is claimed is:

1. A structure for mounting an internal part to a vehicle body forming member of a vehicle body, comprising:

an internal part having an insert bore provided therein;

a deformnable portion formed on an inner peripheral surface of said insert bore; and a vehicle body forming member having an insert boss integrally provided thereon, whereby said internal part may be integrally mounted to said vehicle body forming member by inserting said insert boss into said insert bore while deforming said deformable portion plastically such that said insert bore is fitted over said insert boss, wherein said internal part is mounted in a manner interposed between said vehicle body forming member and another vehicle body forming member, wherein said insert bore is formed to extend through opposite surfaces of said internal part, wherein clip means is provided at an outer end of said insert boss so as to protrude outwardly of said insert boss in a state of assembly, and wherein said another vehicle body forming member is provided with a bore into which said clip means is inserted for connection between said two vehicle body forming members.

2. A structure for mounting an internal part to a vehicle body forming member of a vehicle body, comprising:

an internal part having an insert bore provided therein;

a deformable portion formed on an inner peripheral surface of said insert bore; and a vehicle body forming member having an insert boss integrally provided thereon, whereby said internal part may be integrally mounted to said vehicle body forming member by inserting said insert boss into said insert bore while deforming said deformable portion resiliently such that said insert bore is fitted over said insert boss, wherein said internal part is mounted in a manner interposed between said vehicle body forming member and another vehicle body forming member, wherein said insert bore is formed to extend through opposite surfaces of said internal part, wherein clip means is provided at an outer end of said insert boss so as to protrude outwardly of said insert boss in a state of assembly, and wherein said another vehicle body forming member is provided with a bore into which said clip means is inserted for connection between said two vehicle body forming members.

\* \* \* \* \*